United States Patent
Sivik et al.

(10) Patent No.: US 6,639,034 B2
(45) Date of Patent: *Oct. 28, 2003

(54) DISPERSANT-VISCOSITY IMPROVERS FOR LUBRICATING OIL COMPOSITIONS

(75) Inventors: Matthew R. Sivik, Parma, OH (US); Charles P. Bryant, Euclid, OH (US)

(73) Assignee: The Lubrizol Corporation, Wickliffe, OH (US)

(*) Notice: Subject to any disclaimer, the term of this patent is extended or adjusted under 35 U.S.C. 154(b) by 79 days.

This patent is subject to a terminal disclaimer.

(21) Appl. No.: 10/000,515

(22) Filed: Oct. 23, 2001

(65) Prior Publication Data

US 2002/0086965 A1 Jul. 4, 2002

Related U.S. Application Data

(60) Division of application No. 09/116,367, filed on Jul. 16, 1998, now Pat. No. 6,331,603, which is a division of application No. 08/810,847, filed on Mar. 4, 1997, now Pat. No. 5,821,313, which is a continuation-in-part of application No. 08/665,655, filed on Jun. 18, 1996, now abandoned, which is a continuation-in-part of application No. 08/492,276, filed on Jun. 19, 1995, now Pat. No. 5,969,068.

(51) Int. Cl.[7] .................. C08F 120/54; C08F 120/68
(52) U.S. Cl. .................. 526/264; 526/265; 526/303.1; 526/307; 526/310; 526/307.7; 526/312; 526/328.5
(58) Field of Search ................. 526/307, 264, 526/265, 307.7, 312, 303.1, 310, 328.5

(56) References Cited

U.S. PATENT DOCUMENTS

| | | | |
|---|---|---|---|
| 3,251,906 A | 5/1966 | Bauer | 260/881 |
| 3,252,949 A | 5/1966 | Field et al. | 260/80.5 |
| 3,506,574 A | 4/1970 | Stambaugh et al. | 252/51.5 |
| 3,732,334 A | 5/1973 | Koch et al. | 260/875 |
| 4,281,081 A | 7/1981 | Jost et al. | 525/281 |
| 4,338,418 A | 7/1982 | Jost et al. | 525/281 |
| 4,548,990 A | 10/1985 | Mueller et al. | 625/123 |
| 4,758,364 A | 7/1988 | Seki et al. | 252/56 R |
| 4,822,508 A | 4/1989 | Pennewiss et al. | 252/56 R |
| 4,867,894 A | 9/1989 | Pennewiss et al. | 252/56 |
| 4,968,444 A | 11/1990 | Knoell et al. | 252/56 R |
| 5,043,087 A | 8/1991 | Pennewiss et al. | 252/51.5 R |
| 5,108,635 A | 4/1992 | Gabillet et al. | 252/56 R |
| 5,516,440 A | 5/1996 | Dasai et al. | 252/32 |
| 6,331,603 B1 * | 12/2001 | Sivik et al. | 526/307 |

FOREIGN PATENT DOCUMENTS

| | | |
|---|---|---|
| DE | 1794257 | 2/1971 |
| EP | 0393899 | 4/1990 |
| EP | 0436872 | 7/1991 |
| EP | 0439254 | 7/1991 |
| GB | 1068283 | 5/1967 |

OTHER PUBLICATIONS

*GB 1272324—English language counterpart of DE 1794259.

* cited by examiner

Primary Examiner—Robert Harlan
(74) Attorney, Agent, or Firm—Teresan W. Gilbert; Michael F. Esposito

(57) ABSTRACT

A process for preparing nitrogen-containing copolymers useful as dispersant-viscosity improvers for lubricating oil compositions, additive concentrates and lubricating oil compositions are described.

29 Claims, No Drawings

DISPERSANT-VISCOSITY IMPROVERS FOR LUBRICATING OIL COMPOSITIONS

CROSS REFERENCE TO RELATED APPLICATIONS

This application is a divisional of application Ser. No. 09/116,367 filed Jul. 16, 1998, now U.S. Pat. No. 6,331,603, which in turn is a divisional of application Ser. No. 08/810, 847, filed Mar. 4, 1997, now U.S. Pat. No. 5,821,313, which in turn is a continuation in part of Ser. No. 08/665,655 filed Jun. 18, 1996, now abandoned, which in turn is a continuation in part of application Ser. No. 08/492,276 filed Jun. 19, 1995, now U.S. Pat. No. 5,969,068, the disclosures of each being expressly incorporated herein by reference.

FIELD OF THE INVENTION

This invention relates to dispersant-viscosity improvers for lubricating oils, oil compositions and concentrates containing such dispersant-viscosity improvers, and a process for preparing such dispersant-viscosity improvers.

BACKGROUND OF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers.

Ester group containing polymers are well-known additives for improving the fluidity characteristic of lubricating oils. Polyacrylate, particularly polymethacrylate ester polymers are well-known and are widely used for this purpose.

Dispersants are also well-known in the lubricating art. Dispersants are employed in lubricants to keep impurities, particularly those formed during operation of machinery, in suspension rather than allowing them to deposit on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp. 185–193; C. V. Smalheer and R. K. Smith "Lubricant Additives", Lezius-Hiles Co. (1967); M. W. Ranney, "Lubricant Additives", Noyes Data Corp. (1973), pp. 92–145, M. W. Ranney, "Lubricant Additives, Recent Developments", Noyes Data Corp. (1978), pp. 139–164; and M. W. Ranney, "Synthetic Oils and Additives for Lubricants", Noyes Data Corp. (1980), pp. 96–166. Each of these publications is hereby expressly incorporated herein by reference.

Derivatives of polyacrylate esters are well-known as additives for lubricants that provide not only improved viscosity characteristics, but also may enhance dispersant properties of lubricants.

It is desirable that the viscosity improver or dispersant viscosity improver not adversely affect the low-temperature viscosity of the lubricant containing same. Frequently, while viscosity improvers or dispersant viscosity improvers enhance the high temperature viscosity characteristics of lubricating oil, that is, they reduce the loss of viscosity with increasing temperature, low temperature properties of the treated lubricant become worse.

One of the major requirements for automatic transmission fluids has been improved low temperature performance. This is demonstrated by requirements for maximum Brookfield viscosities of 50,000, 20,000, or even 10,000 centipoise at −40° C. The viscosity modifier, which can comprise nearly 50 weight percent and sometimes even more of the total additive system employed in an automatic transmission fluid can have a major impact on the low temperature performance. Such characteristics are also desirable in other applications such as in gear lubricants and manual transmission fluids. The copolymers of this invention are also useful in many other lubricating oil compositions including, but not limited to engine oils, hydraulic oils, industrial oils, etc.

Accordingly, it is desirable to provide compositions that reduce the extent of loss of viscosity at high temperatures while not adversely increasing the low temperature viscosity of lubricating oil compositions.

It is a primary object of this invention to provide novel multi-purpose lubricant additives.

A more specific object is to provide multi-purpose additives directed to improving the viscosity and dispersant properties of a lubricating composition.

A further object is to provide processes for preparing such multi-purpose additives.

Still another object is to provide additive concentrates containing the novel multi-purpose lubricant additives of this invention.

Yet another object is to provide lubricants having improved dispersant and viscosity properties.

Other objects will in part be obvious in view of this disclosure and will in part appear hereinafter.

SUMMARY OF THE INVENTION

The present invention is directed to a process for preparing a nitrogen containing copolymer comprising reacting, in the presence of a free radical initiator, (A) from about 55% to about 99.9% by weight of one or more alkyl acrylate ester monomers containing from 1 to about 24 carbon atoms in the ester alkyl group, wherein at least about 50 mole % of the esters contain at least 6 carbon atoms in the ester alkyl group, and (B) from about 0.1% to about 45% by weight of at least one nitrogen containing monomer selected from the group consisting of vinyl substituted nitrogen heterocyclic monomers, dialkylaminoalkyl acrylate monomers, dialkylaminoalkyl acrylamide monomers, N-tertiary alkyl acrylamides, and vinyl substituted amines provided that the total of (A) and (B) equals 100%, and optionally, in the presence of a chain transfer agent, wherein monomer (A), the free radical initiator, and if used, the chain transfer agent, are first combined to form a mixture, whereupon from about 10% to about 80% of said mixture is mixed with monomer (B);

from about 20% to about 100% of the mixture of monomers (A) and (B) is heated until an exotherm is noted, then while maintaining reaction temperature, first adding the balance, if any, of the mixture of monomers (A) and (B), over about 0.25 hour to about 5 hours followed by addition over 0.25 to about 5 hours of the remaining mixture of monomer (A) and initiator, optionally adding additional initiator, whereupon the reaction is continued to completion.

This invention also relates to a polyacrylate ester, and more particularly a polymethacrylate ester based dispersant-viscosity improver for lubricating oil compositions. Specifically, the dispersant viscosity improvers of this invention are nitrogen-containing copolymers.

The present invention also relates to additive concentrates and lubricating oil compositions containing compositions prepared by the process of this invention.

As used herein, the terms "acrylate" and "acrylamide" include the 2-alkyl acrylates and 2-alkyl acrylamides, particularly $C_{1-4}$ alkyl-, and especially, methacrylates and methacrylamides.

DETAILED DESCRIPTION OF THE PREFERRED EMBODIMENTS

The present invention provides a process for preparing a composition of matter suitable for use as a dispersant-viscosity improver for lubricating oil compositions comprising nitrogen-containing copolymers derived from one or more alkyl acrylate ester monomers containing, from 1 to about 24 carbon atoms in the ester alkyl group and at least one nitrogen-containing monomer as described in greater detail hereinbelow.

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "a monomer" includes mixtures of monomers of the same type. As another example the singular form "monomer" is intended to include both singular and plural unless the context clearly indicates otherwise.

In the context of this invention the term "copolymer" means a polymer derived from two or more different monomers. Thus, a polymer derived from a mixture of, for example, methyl-, butyl-, $C_{9-11}$-, and $C_{12-18}$- acrylates is a copolymer as defined herein. The copolymers of this invention also contain units derived from nitrogen-containing monomers.

The nitrogen-containing copolymers of this invention may be prepared by a process comprising reacting, in the presence of a free radical initiator, (A) from about 55% to about 99.9% by weight, preferably from about 75–99.5% by weight, more preferably from about 90 to about 99%, often from about 80 to about 99% by weight of one or more alkyl acrylate ester monomers containing from 1 to about 24 carbon atoms in the ester alkyl group, wherein at least about 50 mole % of the esters contain at least 6 carbon atoms, preferably at least 8 carbon atoms, in the ester alkyl group, and (B) from about 0.1% to about 45% by weight, preferably from about 0.5 to about 25% by weight, often from about 0.5 to about 20%, often from about 1% to about 20%. more preferably from about 1 to about 10% by weight of at least one nitrogen containing monomer selected from the group consisting of vinyl substituted nitrogen heterocyclic monomers, dialkylaminoalkyl acrylate monomers, dialkylaminoalkyl acrylamide monomers, N-tertiary alkyl acrylamides, and vinyl substituted amines, provided that the total of the percentages of (A) and (B) equals 100%, and optionally, in the presence of a chain transfer agent, wherein monomer (A), the free radical initiator, and if used, the chain transfer agent, are first combined to form a mixture, whereupon from about 10% to about 80% of said mixture is mixed with monomer (B), heating from about 20% to 100%, often from about 20% to about 80%, more often from about 30% to about 60%, and in one preferred embodiment 100%, of said mixture until an exotherm is noted, then while maintaining reaction temperature, first adding the balance, if any, of the mixture of monomers (A) and (B) over about 0.25 hour to about 5 hours followed by addition over 0.25 to about 5 hours of the remaining mixture of monomer (A) and initiator, then optionally adding additional initiator, whereupon the reaction is continued to completion.

Any combination of the foregoing ratios of reactants is useful provided the total percentages equals 100%.

While addition of additional initiator after all of the monomers are in the reaction is optional, it is often beneficial to utilize one or more additional amounts of initiator to facilitate driving the reaction to completion. As noted, one or more increments, usually one or two increments of additional initiator is used, usually followed by a period of heating at reaction temperature for about 0.25 to about 3 hours after each increment. The skilled person will readily recognize the need for additional initiator at this stage of the process by determining the extent of reaction, for example by infrared analysis to determine the presence of unreacted monomer or by other techniques such as measuring the viscosity of the reaction product.

The nitrogen-containing copolymers of this invention are frequently prepared in an organic diluent. It has been determined that specific amounts and types of diluent present in the nitrogen-containing copolymers of the invention can have a pronounced effect on the low temperature viscosity properties of lubricants containing them.

(A) The Alkyl Acrylate Ester Monomer

As stated hereinabove, the nitrogen-containing copolymer comprises units derived from (A) alkyl acrylate ester monomers containing from 1 to about 24 carbon atoms in the ester alkyl group, wherein at least about 50 mole % contain at least 6, preferably at least 8, carbon atoms in the ester alkyl group. More often (A) comprises a mixture of ester monomers, having from about 5% to about 75% by weight, preferably from about 30% to about 60% by weight of alkyl acrylate ester monomers containing from 1 to 11 carbon atoms in the ester alkyl group and (B) from about 25% to about 95% by weight, preferably from about 40% to about 70% by weight of alkyl acrylate ester monomers containing from 12 to about 24 carbon atoms in the ester alkyl group, wherein as noted hereinabove, at least about 50 mole % contain at least 6 carbon atoms, preferably at least 8 carbon atoms, in the ester alkyl group. In an especially preferred embodiment, the alkyl acrylate ester monomers comprise alkyl methacrylate esters.

In one particular embodiment, monomer (A) comprises at least 5% by weight of alkyl acrylate esters having from 4 to 11 carbon atoms in the ester alkyl group. In another embodiment, monomer (A) comprises from about 5% to about 40%, often from about 10% to about 40% by weight alkyl acrylate esters having from 1 to 4 carbon atoms in the ester alkyl group. In still another embodiment, monomer (A) comprises from about 60% to about 90% by weight of alkyl acrylate esters having from 9 to 11 carbon atoms in the ester alkyl group.

In one preferred embodiment, monomer (A) consists essentially of $C_{12-24}$, often $C_{12-18}$, and frequently $C_{12-15}$ methacrylates.

The acrylate ester monomers can be prepared by conventional methods well known to those of skill in the art. For example, acrylate ester monomers are most often prepared via the propylene oxidation process, a two stage vapor phase oxidation of propylene to acrylic acid, which is then esterified to the desired ester. Previously, the manufacture of acrylates involved the petrochemistry of materials such as acetylene, acrylonitrile and others.

For methacrylates, processes used often vary, depending on the desired monomer. The acetone cyanohydrin process involves the reaction of acetone with HCN to form acetone cyanohydrin which is then reacted with the desired alcohol to form the ester. Propylene carbonylation and many other processes are also used.

A variety of procedures are described in considerable detail in the section entitled "Acrylic and Methacrylic Ester Polymers" in the Encyclopedia of Polymer Science and Engineering, Vol. 1, pp. 247–251, Wiley-Interscience, New York (1985).

Many alkyl acrylate esters are commercially available. Suppliers include, RohMax; San Esters Corp., with offices in New York, N.Y.; Mitsubishi Rayon Co. Ltd.; Polysciences, Inc., Warrington, Pa.; Sartomer Co., Exton, Pa.; and others.

(B) The Nitrogen-Containing Monomer

The nitrogen-containing copolymers of this invention also comprise units derived from (B) from about 0.1% to about 45% by weight, often up to about 20% by weight, and in one embodiment from about 0.5% to about 10% by weight, especially from about 1.5% to about 8% by weight of at least one nitrogen-containing monomer selected from the group consisting of vinyl substituted nitrogen heterocyclic monomers, dialkylaminoalkyl acrylate monomers, dialkylaminoalkyl acrylamide monomers, N-tertiary alkyl acrylamides, and vinyl substituted amines.

In one embodiment, the nitrogen-containing monomer is an N-vinyl substituted heterocyclic monomer. Examples of such monomers include N-vinyl imidazole, N-vinyl pyrrolidinone and N-vinyl caprolactam.

In another embodiment, the vinyl substituted heterocyclic monomer is vinyl pyridine.

In yet another embodiment, the nitrogen-containing monomer is a N,N-dialkylaminoalkyl acrylamide or acrylate wherein each alkyl or aminoalkyl group contains, independently, from 1 to about 8 carbon atoms.

In a further embodiment, the nitrogen-containing monomer is a tertiary-alkyl acrylamide, preferably tertiary butyl acrylamide.

The Diluent

As noted hereinabove, the copolymers of this invention may be prepared in the presence of a diluent. A diluent may also be added to a substantially diluent-free copolymer, usually by dissolving or dispersing the substantially diluent-free polymer in an appropriate diluent. In another embodiment, an additional diluent, often a higher boiling diluent such as an oil, may be added to a copolymer which was prepared in, and still contains, a lower boiling diluent which is then removed by common methods such as distillation.

In one embodiment, the diluent is a mineral oil. In a preferred embodiment the mineral oil consists essentially of hydrotreated naphthenic oil. Also contemplated are hydrodewaxed mineral oils.

The diluent may also be a synthetic oil. Common synthetic oils are ester type oils, polyolefin oligomers or alkylated benzenes.

The diluent-containing copolymers of this invention are referred to herein as additive concentrates. Such additive concentrates are then added, along with other desirable performance-improving additives, to an oil of lubricating viscosity to prepare the finished lubricant composition.

The additive concentrates preferably comprise from about 25% to about 90% by weight of copolymer, preferably from 35% to about 85% by weight, and from about 10% to about 75% by weight of diluent, preferably from about 15% to about 65% by weight of diluent.

As is often the case in the art, performance improving additives may be combined with the polymers of this invention, together with a diluent as defined herein, to form a single additive concentrate which can then be mixed with an oil of lubricating viscosity to form a lubricating oil composition.

In one embodiment, selection of diluents having particular characteristics leads to enhanced performance of dispersant-viscosity improvers of this invention. For example, lubricating oil compositions comprising additive concentrates containing certain diluents together with the nitrogen-containing polymers of this invention have enhanced low temperature characteristics. Particularly valuable are lubricating oil compositions that display excellent viscosity characteristics at very low temperatures, for example, from –5° C. to –40° C.

The certain diluents that impart surprising and exceptional low temperature performance when used in conjunction with the dispersant viscosity improvers of this invention, have in common very low viscosity at very low temperatures. In particular they all display Brookfield viscosities (expressed in centipoise) at –26° C. ranging from about 50 to about 400, more preferably from about 80 to about 200. At –40° C. useful oils have Brookfield viscosities (expressed in centipoise) ranging from about 100 to about 1500, more preferably from about 125 to about 600. Brookfield viscosities are determined employing ASTM Procedure D-2983 described in greater detail hereinafter. These particularly useful diluents display viscosities (ASTM Procedure D-445) at 40° C. ranging from about 2.5 to about 6 centistokes and at 100° C. ranging from about 1 to about 2.5 centistokes.

Included among such useful diluents are naphthenic oils, hydrotreated naphthenic oils, and alkylated aromatics, particularly alkylated benzenes having at least one alkyl group containing from about 8 to about 24 carbon atoms, preferably from about 12 to about 18 carbon atoms. Especially useful are hydrotreated naphthenic oils, examples being Risella G-07 from Shell Oil, Cross Oil Co.'s L-40, a 40 neutral hydrotreated naphthenic oil and L-60, which is a 60 neutral oil.

Low temperature viscosity (Brookfield Viscosity) of fluid lubricants is determined using ASTM Procedure 2983, Standard Test Method for Low Temperature Viscosity of Automotive Fluid Lubricants Measured by Brookfield Viscometer, which appears in the Annual Book of ASTM Standards, Section 5, ASTM, Philadelphia, Pa., USA. This procedure employs a Brookfield Viscometer which is described in the procedure. The device is available from Brookfield Engineering Laboratories, Stoughton, Mass., USA.

ASTM Procedure D-445 is described hereinafter.

Chain Transfer Agents

The process may be conducted in the presence of a chain transfer agent. The use of chain transfer agents to regulate and limit molecular weight in polymer reactions is known, see for example "Concise Encyclopedia of Polymer Science and Engineering", J. I. Kroschwitz, Ed., Wiley-Interscience (New York, 1990), page 139.

An extensive discussion of chain transfer, its effects, and chain-transfer agents together with an extensive bibliography, appears in the "Encyclopedia of Polymer Science and Technology", H. F. Mark, N. G. Gaylord, and N. M. Bikales, Eds., Interscience, (New York, 1965), pp. 575–610. Both of these are expressly incorporated herein by reference.

For the present application, sulfur compounds, especially mercaptans, particularly tertiary dodecyl mercaptan, are preferred.

The Nitrogen-Containing Copolymer

The products obtained by the process of this invention are copolymers of this invention have a weight average molecular weight ($M_w$) ranging from about 10,000 to about 500,000, more often from about 30,000 to about 250,000, frequently from about 20,000 to about 100,000 and polydispersity values ($M_w/M_n$) ranging from about 1.2 to about 5.

Molecular weights of polymers are determined using well-known methods described in the literature. Examples of procedures for determining molecular weights are gel permeation chromatography (also known as size-exclusion chromatography) and vapor phase osmometry. These and other procedures are described in numerous publication including:

P. J. Flory, "Principles of Polymer Chemistry" Cornell University Press (1953), Chapter VII, pp. 266–316, and "Macromolecules, an Introduction to Polymer Science", F. A. Bovey and F. H. Winslow, Editors, Academic Press (1979), pp. 296–312.

W. W. Yau, J. J. Kirkland and D. D. Bly, "Modem Size Exclusion Liquid Chromatography", John Wiley and Sons, New York, 1979.

A measurement which is complementary to a polymer's molecular weight is the melt index (ASTM D-1238). Polymers of high melt index generally have low molecular weight, and vice versa. Mooney Viscosity (ASTM Procedure D-1646-87) relates indirectly to polymer molecular weight. All other factors being equal, as molecular weight of the polymer increases, so too does the Mooney viscosity.

ASTM Procedures D-1238 and D-1646-87 appear in Volumes 8 and 9, respectively, of the aforementioned Annual Book of ASTM Standards.

A preferred method, and the method employed to determine the molecular weights of polymers as set forth herein, is gel permeation chromatography (GPC) employing polyacrylate standards.

As noted hereinabove, acrylic copolymers have been previously prepared by several different techniques. In one embodiment, the acrylate ester monomers and nitrogen-containing monomer are reacted together. In another embodiment, the acrylate esters are reacted to form an acrylate ester copolymer backbone onto which is grafted a nitrogen-containing monomer. In still another embodiment, a mixture of acrylate and nitrogen-containing monomers may be grafted onto a preformed acrylate ester polymer backbone.

In the first embodiment, a mixture of monomers is charged to a reactor together with, if desired, diluent and again, if desired, chain transfer agent. The materials are stirred under a nitrogen atmosphere. Subsequently, a polymerization initiator is added and the materials are heated to reaction temperature. The reaction is continued until the desired degree of polymerization is attained.

In the second embodiment, the acrylate monomers are polymerized, then the grafting of the nitrogen-containing monomer onto the preformed acrylate ester copolymer is accomplished. A mixture of additional acrylate monomers together with nitrogen-containing monomer may be grafted onto the preformed acrylate ester polymer.

In the grafting process, additional initiator is usually employed during the grafting step. In either process, additional initiator may be added during processing.

In another previously used method, the monomers are polymerized incrementally. A mixture of monomers together with a polymerization initiator is prepared. A portion, typically about 20% to about 40%, more often about 33%, of the mixture, is charged to a reactor with the balance being placed in an addition vessel. The reactants are heated under a nitrogen atmosphere until an exothermic reaction is noted. When the exothermic reaction begins to subside, addition of the balance of the monomer-initiator mixture is begun, while maintaining, via heating or cooling, as needed, the desired reaction temperature.

The process of this invention relates to a new procedure. In this process, monomer (A), the free radical initiator and if used, the chain transfer agent are first combined to form a mixture, whereupon from about 10% to about 80% of said first mixture is mixed with monomer (B). From about 20% to about 100% of this mixture is then heated until an exotherm is noted. Thereafter, while maintaining reaction temperature, the balance, if any, of the remaining mixture of monomers (A) and (B) is added followed by the addition of the remaining monomer (A) and initiator and if used, chain transfer agent, then optionally, adding one or more increments of additional initiator and continuing the reaction to completion.

Frequently, when nitrogen-containing copolymers are prepared, the preparation has an odor which is often considered to be objectionable. While not wishing to be bound by theory, it is considered unlikely that the polymer, per se, possesses any noticeable odor. One theory is that the odor may arise from the presence of small amounts of unreacted monomer, particularly nitrogen-containing monomer, or small amounts of other impurities. The copolymers prepared by the process of this invention have been found to be substantially free of objectionable odor.

Polymerization can take place under a variety of conditions, among which are bulk polymerization, solution polymerization, emulsion polymerization, suspension polymerization and nonaqueous dispersion techniques.

The process of this invention makes use of the conventional methods of radical copolymerization.

Such methods are described in the work "Encyclopedia of Polymer Science and Engineering" (H. F. Mark, N. M. Bikales, C. G. Overberger and G. Menges), 2nd edition (1988), published by Wiley Interscience.

These methods include free-radical initiated polymerization employing azo compounds or peroxides. Also described therein are photochemical and radiation initiated methods.

Useful initiators include organic peroxides, hydroperoxides and azo compounds. Redox initiators are also useful.

Molecular weights of the polymers can be controlled employing a number of techniques including choice of initiator, reaction temperature, concentration of monomers and solvent type. As noted previously, chain transfer agents can be used.

Free radical generating reagents useful as polymerization initiators are well known to those skilled in the art. Numerous examples of free radical initiators are mentioned in the above-referenced texts by Flory and Bovey and Winslow. An extensive listing of free radical initiators appears in J. Brandup and E. H. Immergut, Editors, "Polymer Handbook", 2nd edition, John Wiley and Sons, New York (1975), pp. II-1 to II-40. Numerous free radical initiators are available and many are commercially available in large quantities. Included among free radical initiators are t-butyl peroxide, t-butyl hydroperoxide, t-amyl peroxide, cumyl peroxide, dibenzoyl peroxide (Aldrich), t-butyl m-chloroperbenzoate, azobisvaleronitrile, t-butyl peroctoate and tertiary-butyl perbenzoate, (Trigonox 21 and Trigonox C, respectively, both from AKZO) and 2,2'-azobis (isobutyronitrile), VAZO-64, and, 2,2'-azobis (methylbutyronitrile), VAZO-67, both from DuPont.

Free radical initiators are usually used in amounts ranging from about 0.01% to about 10 percent by weight based on the total weight of reaction mixture. Generally, the initiators are used at about 0.05% to about 3% by weight, even more often from about 0.1 to about 1% by weight.

The choice of free radical initiator can be an important consideration. Considerations include the half-life of the initiator at a given temperature, nature of the reactants, reaction temperature, solvent or diluent, and the like.

The products of the present invention are generally prepared at reaction temperatures ranging from about 60° C. to about 160° C. The half-life of an initiator at a given temperature is an important consideration.

Because acrylic polymerizations are usually accompanied by liberation of considerable heat, care must be taken to avoid uncontrolled reaction. Temperatures can be controlled by using reactors with cooling jackets, controlling rates of addition and use of reaction solvents.

While the process of the instant invention is conducted in conventional reactors employing agitation means including mechanical stirrers or circulating pumps, another useful means for preparing the copolymers of this invention is to employ a high energy mechanical mixing device. These include roll mills, ball mills or extruders. Of these, extruders are preferred since the comonomers can be fed to the feed hopper in any desired fashion. Methods of employing such devices, and especially extruders, are described in a number of patents including Hayashi et al, U.S. Pat. No. 4,670,173 and Sopko et al, U.S. Pat. No. 5,039,433, both of which are expressly incorporated herein by reference.

The following examples are intended to illustrate several compositions of this invention as well as means for preparing same. Unless indicated otherwise all parts are parts by weight. It is to be understood that these examples are intended to illustrate several compositions and procedures of the invention and are not intended to limit the scope of the invention. Molecular weight values are determined employing gel permeation chromatography (GPC) employing well-characterized polymethacrylate (PMA) calibration standards. Filtrations are conducted using a diatomaceous earth filter aid.

EXAMPLE 1

A container is charged with 57.5 parts methyl methacrylate, 12.7 parts butyl methacrylate, 226.5 parts each of $C_{9-11}$ methacrylate and $C_{12-15}$ methacrylate, 114.8 parts $C_{16-18}$ methacrylate, 4.22 parts tert-dodecyl mercaptan and 164.4 parts 85 neutral (85N) paraffinic oil followed by mixing at ambient temperature for 0.2 hour. To this solution are added 4.22 parts VAZO-67 dissolved in 9 parts toluene followed by mixing for 0.1 hour. One third (273 parts) of this solution is placed in a reactor equipped with stirrer, reflux condenser, thermocouple in solution and a $N_2$ inlet atop an addition funnel filled with the remaining ⅔ (547 parts) of methacrylate solution. To the solution in the reactor are added 11.7 parts N-(3-(dimethylamino)propyl) methacrylamide, the materials are mixed for 0.2 hour then heated, under $N_2$, to 110° C. over 0.5 hour whereupon heating is discontinued and the temperature rises exothermically to 141° C. over 3 minutes. After the exothermic rise in temperature, the temperature begins to drop and after 1 minute, the temperature is 140° C. The remaining materials are then added dropwise over 2 hours during which time the temperature drops to 110° C. After the addition is completed, the materials are held at 110° C. for 0.5 hour, 0.43 part Trigonox 21 is added, the materials are held at 110° C. for 1 hour, 0.43 part Trigonox 21 are added followed by heating at 110° C. for an additional hour. The materials are heated to 125° C. and stripped at 20 mm Hg for 0.5 hour, collecting 9 parts distillate followed by filtration at 120° C. The filtrate has $M_w$=80,630 and $M_w/M_n$=3.28.

EXAMPLE 2

A container is charged with 57.5 parts methyl methacrylate, 12.7 parts butyl methacrylate, 226.5 parts each of $C_{9-11}$ methacrylate and $C_{12-15}$ methacrylate, 114.8 parts $C_{16-18}$ methacrylate, 4.22 parts tert-dodecyl mercaptan, 164.6 parts 40N naphthenic oil (Shell Risella G-07) and 4.22 parts VAZO-67 dissolved in 8 parts toluene followed by mixing for 0.1 hour. One third of this solution is placed in a reactor equipped with stirrer, reflux condenser, thermocouple in solution and a $N_2$ inlet atop an addition funnel filled with the remaining ⅔ of the methacrylate solution. To the solution in the reactor are added 11.7 parts N-vinylimidazole, the contents of the flask are mixed for 0.1 hour then heated, under $N_2$, to 110° C. over 0.5 hour whereupon an exotherm to 140.3° C. is observed. After the exothermic rise in temperature, the temperature begins to drop. The remaining materials are then added dropwise over 2 hours during which time the temperature drops to 110° C. After the addition is completed, the materials are cooled to 90° C., 0.43 part Trigonox 21 is added, the materials are held at 90° C. for 1 hour, an additional 0.43 part Trigonox 21 is added followed by heating at 90° C. for an additional 2 hours. The materials are heated to 120° C. and stripped at 20 mm Hg for 0.1 hour, followed by filtration at 120° C. The filtrate has $M_w$=64,178 and $M_w/M_n$=3.4.

EXAMPLE 3

The procedure of Example 2 is followed replacing Risella G-07 oil with Cross L-40 (40N naphthenic oil, Cross Oil Co.). The exothermic rise in temperature is to 137° C., stripping is for 0.3 hour. The product has $M_w$=63,917 and $M_w/M_n$=3.37.

EXAMPLE 4

A container is charged with 172.5 parts methyl methacrylate, 38.1 parts butyl methacrylate, 679.5 parts each, 344.4 parts $C_{16-18}$ methacrylate, 17.66 parts VAZO-67 in 21 parts toluene and 443.8 parts Risella G-07 oil followed by thorough mixing. One-third of the mixture and 35.1 parts N-(3-dimethylamino)propyl) methacrylamide are charged to a reactor equipped with a stirrer, condenser, and subsurface inlet tube fitted with an addition funnel. The contents of the reactor are heated to 110° C. whereupon an exotherm to 147.7° C. is observed. As the exotherm subsides, the remaining ⅔ of the methacrylate solution is added dropwise over 1.5 hours followed by mixing at 110° C. for 0.5 hour. To the mixture are added 1.29 parts Trigonox-21 are added, the materials are held at temperature for 1 hour, followed by the addition of 1.29 parts Trigonox-21 and heating for an additional hour. The materials are stripped to 125° C. at 20 mm Hg for 0.5 hour. The residue is filtered. The filtrate has $M_w$=78,457 and $M_w/M_n$=3.42.

EXAMPLE 5

A mixture of 57.5 parts methyl methacrylate, 12.71 parts butyl methacrylate, 226.5 parts $C_{9-11}$ methacrylate, 277.8 parts $C_{12-15}$ methacrylate, 65.5 parts $C_{16-18}$ methacrylate, 4.22 parts each of VAZO-67 and t-dodecyl mercaptan, and 164.6 parts 85N paraffinic oil is prepared. One third of the mixture and 11.7 parts N-(3-dimethylamino)propyl) methacrylamide are added to a reactor equipped with a stirrer, thermowell, condenser and an inlet tube fitted with an addition funnel and a $N_2$ inlet. The contents of the flask are heated to 110° C. whereupon an exotherm to 144.2° C. is observed. As the exotherm subsides, the remaining ⅔ of the methacrylate mixture is added dropwise over 2 hours while the temperature drops to 110° C. The materials are then held at temperature for 0.5 hours followed by addition of 0.43 parts Trigonox-21, heating at 110° C. for 1 hour. An additional 0.43 part Trigonox-21 is added, heating at 110° C. is continued for 1 hour, the temperature is increased to 120° C. and the materials are stripped at 120° C. and 20 mm Hg for 0.5 hour. The residue is filtered. The filtrate has $M_w$=80,448 and $M_w/M_n$=3.35.

EXAMPLE 6

A container is charged with 35.4 parts methyl methacrylate, 7.8 parts butyl methacrylate, 139.4 parts $C_{9-11}$ methacrylate, 139 parts $C_{12-15}$ methacrylate, 72 parts $C_{16-18}$ methacrylate, 100 parts mineral oil (85N, Total France), and 2 parts VAZO-67. The materials are thoroughly mixed. A reactor equipped with a stirrer, reflux condenser, $N_2$ inlet tube with addition funnel, and thermocouple is charged with one-third of the monomer mixture and 7.2 parts dimethylaminopropyl methacrylamide with the remaining ⅔ of the monomer mixture placed in the addition funnel. The mixture in the flask is heated to 110° C. under $N_2$ over 0.3 hour whereupon an exotherm to 140° C. over 2 minutes is observed. After 2 more minutes the exotherm begins to subside and after 3 more minutes the temperature is 133° C. whereupon addition of the monomer mixture from the addition funnel is begun. After 0.2 hours the temperature has decreased to 110° C. Addition of the monomer is over 2 hours, maintaining temperature at 107–114° C. The materials are held at 110° C. for 1 hour whereupon 0.3 part Trigonox 21 is added, the materials are heated at 110° C. for 1.3 hours, 0.3 part Trigonox 21 is added, the materials are heated at 110° C. for 1.5 hour, then an additional 0.3 part Trigonox 21 is added followed by heating for 1.5 hour. The temperature is increased to 150° C., 166 parts of mineral oil (85N, Total) are added and the materials are stripped to 150° C. at 14 mm Hg. The materials are filtered. The filtrate has $M_w$~169,000.

EXAMPLE 7

A container is charged with 57.5 parts methyl methacrylate, 12.7 parts butyl methacrylate, 226.5 parts each of $C_{9-11}$ methacrylate and $C_{12-15}$ methacrylate, 114.8 parts $C_{16-18}$ methacrylate, 164.4 parts 85 neutral (85N) paraffinic oil, and 4.22 parts VAZO-67 followed by mixing at ambient temperature for 0.2 hour. One third of this mixture is placed in a reactor equipped with stirrer, reflux condenser, thermocouple in solution and a $N_2$ inlet with an addition funnel filled with the remaining ⅔ of methacrylate solution. To the solution in the reactor is charged 11.7 parts dimethylaminopropyl methacrylamide. The contents of the reactor are heated to 110° C. whereupon an exotherm to 146.5° C. is observed. As the temperature begins to fall, the remaining ⅔ of the monomer mixture is added over 1.5 hours as the temperature decreases to 110° C. The materials are heated for 0.5 hour at 110° C., 0.43 part Trigonox 21 is added followed by heating for 1 hour at 110° C. followed by addition of 0.43 part Trigonox 21 and heating at 110° C. for 1 hour. The materials are mixed with an additional 108.5 parts 85N oil, vacuum stripped and filtered. The filtrate has $M_w$=129,409 and $M_w/M_n$=3.37.

EXAMPLE 8

A container is charged with 57.5 parts methyl methacrylate, 12.7 parts butyl methacrylate, 226.5 parts of $C_{9-11}$ methacrylate, 279 parts $C_{12-15}$ methacrylate, 63.5 parts $C_{16-18}$ methacrylate, 169 parts 85 neutral (85N) paraffinic oil, 4.05 parts VAZO-67, and 4.05 parts t-dodecyl mercaptan followed by mixing at ambient temperature for 0.2 hour to form a first mixture. One half of this mixture and 37.9 parts dimethylaminopropyl methacrylamide are mixed, forming a second mixture. One half of this second mixture is charged to a reactor equipped with stirrer, reflux condenser, thermocouple in solution and a $N_2$ inlet with an addition funnel filled with the balance of the second mixture being placed in the addition funnel. The materials in the flask are heated to 110° C. whereupon an exotherm to 145° C. is observed. Over 2 hours the remaining second mixture is added dropwise from the addition funnel during which time the temperature drops to 110° C. and is maintained. The balance of the methacrylate monomer mixture, the first mixture, is placed in the addition funnel and added dropwise over 2 hours while maintaining 110° C. The materials are held at 110° C. for 0.5 hour, then 0.43 part Trigonox 21 is added. After heating for 1 hour, an additional 0.43 part Trigonox 21 is added followed by heating at 110° C. for one more hour. The materials are vacuum stripped. The residue is the product.

The data in the following table illustrate the effect of the products of this invention with respect to improving viscosity characteristics of a typical oil of lubricating viscosity. Each oil blend contains 5% or 10% by weight of the indicated product (no adjustment is made for diluent content) in a solvent refined 100 neutral mineral oil. Viscosities are determined employing the procedure set out in ASTM Standard D-445 and the viscosity index is determined employing the procedure set out in ASTM Standard D-2270, both of which appear in the Annual Book of ASTM Standards, Section 5, Petroleum Products. Lubricants and Fossil Fuels, ASTM, 1916 Race Street, Philadelphia, Pa., USA. ASTM Procedure D-445 covers, in general, the determination of kinematic viscosity of liquid petroleum products by measuring the time for a volume of liquid to flow under gravity through a calibrated glass capillary viscometer. ASTM Procedure D-2270 provides a means for calculating Viscosity index. Viscosities in the following table are given in centistokes.

| | | Additive Effect—Viscosity and Viscosity Index | | | | | |
|---|---|---|---|---|---|---|---|
| | | @ 5% Treatment | | | @ 10% Treatment | | |
| Product of | | Viscosity | | | Viscosity | | |
| Example | | 40° C. | 100° C. | Viscosity Index | 40° C. | 100° C. | Viscosity Index |
| None | | 20 | 4.09 | 100 | — | — | — |
| 1 | | 28.2 | 5.8 | 152 | 39.1 | 8.0 | 180 |
| 2 | | 26.8 | 5.5 | 157 | 35.5 | 7.3 | 178 |
| 3 | | 26.9 | 5.5 | 150 | 36.1 | 7.4 | 177 |
| 4 | | 28.0 | 5.7 | 151 | 38.5 | 7.8 | 179 |
| 6 | @20%: | 92.4 | 18.7 | 225 | 44.5 | 9.4 | 202 |
| 7 | | 30.5 | 6.34 | 166 | 45.3 | 9.3 | 196 |

Low Temperature Characteristics

As mentioned hereinabove, low temperature characteristics of lubricating compositions comprising additive concentrates of this invention which contain certain selected diluents are unexpectedly improved. This benefit is illustrated by the data in the following table.

Each blend contains the product of the indicated Example (without adjusting for diluent content) in the indicated amount (% by weight) in a partial synthetic lubricating oil containing 80% by weight of mineral oil (90N, Esso Stanco) and 20% by weight of a polyalphaolefin oil having a viscosity at 100° C. of 4 centistokes (Emery 3004) and 6% by weight (including diluents) of a fully formulated additive package containing an ashless dispersant, extreme pressure/antiwear additives, antioxidants and detergents. Viscosities at 40° C. and 100° C. are given in centistokes; Brookfield viscosities are in centipoise.

| Product of Example | Viscosity 40° C. | 100° C. | Viscosity Index | Brookfield Viscosity (−40° C.) |
|---|---|---|---|---|
| None | 18.0 | 3.9 | 111 | Solid |
| 1 (8.5%) | 36.4 | 7.49 | 179 | 18600 |
| 2 (5.0%) | 27.4 | 5.78 | 161 | 11800 |
| 3 (5.0%) | 27.5 | 5.79 | 160 | 12000 |
| 6 (5.8%) | 32.3 | 6.90 | 181 | 13600 |
| 7 (6.55%) | 34.7 | 7.33 | 184 | 15000 |

As is apparent, the polymers of these Examples are desirable viscosity index improvers. Another significant benefit is that the products of the instant invention improve both high temperature and low temperature characteristics of base oils. The viscosity of base oil without additive is strongly affected by changes in temperature while both the low and high temperature properties of the additive treated oils are less affected. In fact, the additives of this invention have a desirable viscosity lowering effect at very low temperatures yet still reduce the loss of viscosity at high temperatures. In effect, the additives perform not only as dispersant-viscosity improvers but also provide a fluidizing effect at very low temperatures.

In the following Table are given viscosity characteristics of diluents used to prepare the dispersant-viscosity improvers used in the lubricating oil compositions of the preceeding Table:

| Oil | Used in Example | Viscosity 40° C. | Viscosity 100° C. | Viscosity Index | Brookfield −26° C. | Viscosity −40° C. |
|---|---|---|---|---|---|---|
| Cross L-40 | 3 | 4.60 | 1.54 | 0 | — | 450 |
| Risella G-07 | 2, 4 | 2.91 | 1.18 | 0 | 90 | 150 |
| 85N | 1, 5 | 15.56 | 3.50 | 102 | 60,000 | Solid |

Noteworthy is the fact that the hydrotreated naphthenic oils have a viscosity index so low as to be virtually unmeasureable. Yet, when the viscosity improvers of Examples 2 and 3 are used in a lubricating oil composition, surprisingly the viscosity index of the resulting oil blend is at least comparable to those incorporating dispersant viscosity improver of Example 1 which contain diluents having relatively high viscosity indices.

Also surprising is that while the dispersant viscosity improvers of Examples 2 and 3 contain oils having relatively low kinematic viscosity, and provide good low temperature properties to a lubricating oil composition, there is no adverse effect on 40° C. and 100° C. viscosities.

The Oil of Lubricating Viscosity

The lubricating compositions and methods of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyolethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. Pat. No. 4,326,972, European Patent Publication 107,282, and A. Sequeria, Jr., Lubricant Base Oil and Wax Processing, Chapter 6, Marcel Decker, Inc., New York (1994), each of which is hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

As mentioned, lubricating oil compositions of this invention may contain other components. The use of such additives is optional and the presence thereof in the compositions of this invention will depend on the particular use and level of performance required. Thus the other additive may be included or excluded. The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, pour point depressing agents, extreme pressure agents, anti-wear agents, color stabilizers and anti-foam agents. The above-mentioned dispersants and viscosity improvers may be used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or anti-oxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitrites, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |

| | | | |
|---|---|---|---|
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

The various additives described herein can be added directly to the lubricant. Preferably, however, they are diluted with a substantially inert, normally liquid organic diluent such as mineral oil, naphtha, benzene, toluene or xylene, to form an additive concentrate. Preferred additive concentrates contain the diluents referred to hereinabove. These concentrates usually comprise about 0.1 to about 80% by weight of the compositions of this invention and may contain, in addition, one or more other additives known in the art or described hereinabove. Concentrations such as 15%, 20%, 30% or 50% or higher may be employed.

The lubricating compositions of this invention are illustrated by the examples in the following Tables. The lubricating compositions are prepared by combining the specified ingredients, individually or from concentrates, in the indicated amounts and oil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. These examples are presented for illustrative purposes only, and are not intended to limit the scope of this invention.

EXAMPLE I

The product of Example 1 (8.7 parts) is combined with a mineral oil of lubricating viscosity, 1.43% of a polybutene ($M_n \equiv 1000$) substituted succinic anhydride-ethylene polyamine reaction product, 0.29% of $CS_2$ post treated polybutene ($M_n \equiv 1000$) substituted succinic anhydride-ethylene polyamine reaction product, 0.15% of dibutyl hydrogen phosphite, 0.04% of 85% phosphoric acid, 0.33% borated polybutene ($M_n \equiv 1000$) substituted succinic anhydride-ethylene polyamine reaction product, 0.20% borated $C_{16}$ epoxide, 0.63% di-(nonyl phenyl) amine, 0.50% of reaction product of t-dodecyl mercaptan and propylene oxide, 0.02% of N,N,-diethanol tallow amine, 0.08% of zinc oleate, and 0.025% red dye.

EXAMPLE II

A lubricating composition as in Example 1 is prepared replacing 0.2% of the product of Example 1 with 0.2% of a styrene-maleate copolymer neutralized with aminopropyl morpholine.

EXAMPLE III

The product of Example 7 (6.55 parts) is combined with a mineral oil of lubricating viscosity, 1.5% of a polybutene ($M_n \equiv 1000$) substituted succinic anhydride-ethylene polyamine reaction product, 0.15% of dibutyl hydrogen phosphite, 0.33% borated polybutene ($M_n \equiv 1000$) substituted succinic anhydride-ethylene polyamine reaction product, 0.20% borated $C_{16}$ epoxide, 0.63% di-(nonyl phenyl) amine, 0.50% of reaction product of t-dodecyl mercaptan and propylene oxide, 0.05% of N,N,-diethanol tallow amine, 0.03% tolyl triazole, 0.42% calcium overbased (Metal ratio= 1.2) alkyl benzene sulfonic acid, 0.6% dodecyl-substituted sulfolene, 0.1% 1-hydroxyethyl-2-heptadecyl imidazoline, and 0.025% red dye. This composition has viscosity (centistokes) of 30.28@40° C. and 6.90@100° C., viscosity index=199 and Brookfield viscosity (centipoise)@–40° C. of 7060.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A nitrogen containing copolymer prepared by a process comprising reacting, in the presence of a free radical initiator,
   (A) from about 55% to about 99.9% by weight of one or more alkyl acrylate ester monomers containing from 1 to about 24 carbon atoms in the ester alkyl group, wherein at least about 50 mole % of the esters contain at least 6 carbon atoms in the ester alkyl group, and
   (B) from about 0.1% to about 45% by weight of at least one nitrogen containing monomer selected from the group consisting of vinyl substituted nitrogen heterocyclic monomers and vinyl substituted amines provided that the total of (A) and (B) equals 100%, and optionally, in the presence of a chain transfer agent, wherein monomer (A), the free radical initiator, and if used, the chain transfer agent, are first combined to form a mixture, whereupon from about 10% to about 80% of said mixture is mixed with monomer (B);
   from about 20% to about 100% of the mixture of monomers (A) and (B) is heated until an exotherm is noted, then while maintaining reaction temperature, first adding the balance, if any, of the mixture of monomers (A) and (B) over about 0.25 hour to about 5 hours followed by addition over 0.25 to about 5 hours of the remaining mixture of monomer (A) and initiator, optionally adding additional initiator, whereupon the reaction is continued to completion.

2. The copolymer of claim 1 wherein from about 20% to about 80% of the mixture of monomers (A) and (B) is heated until the exotherm is noted.

3. The copolymer of claim 1 wherein 100% of the mixture of monomers (A) and (B) is heated until the exotherm is noted.

4. The copolymer of claim 1 wherein at least about 50 mole % of reactant (A) comprises alkyl acrylate esters containing at least 8 carbon atoms in the alkyl group.

5. The copolymer of claim 1 wherein from about 80 to about 99% by weight of alkyl acrylate monomer (A) is reacted with from about 1 to about 20% by weight of nitrogen containing monomer (B).

6. The copolymer of claim 1 wherein monomer (A) comprises a mixture of alkyl acrylate ester monomers.

7. The copolymer of claim 1 wherein the alkyl acrylate ester monomers are alkyl methacrylate ester monomers.

8. The copolymer of claim 6 wherein the mixture of alkyl acrylate monomers comprises from about 5% to about 75% by weight of alkyl acrylate ester monomers containing from 1 to 11 carbon atoms in the ester alkyl group and from about 25% to about 95% by weight of alkyl acrylate ester monomers containing from 12 to about 24 carbon atoms in the ester alkyl group.

9. The copolymer of claim 8 wherein the mixture of alkyl acrylate monomers is reacted with from about 0.1% to about 20% by weight of (B) the at least one nitrogen containing monomer provided that the total equals 100%.

10. The copolymer of claim 9 wherein the mixture of alkyl acrylate monomers comprises from about 30% to about 60% by weight of alkyl acrylate ester monomers containing from 1 to 11 carbon atoms in the ester alkyl group and from about 40% to about 70% by weight of alkyl acrylate ester monomers containing from 12 to about 24 carbon atoms in the ester alkyl group, is reacted with from about 0.5% to about 10% by weight of monomer (B).

11. The copolymer of claim 1 wherein monomer (A) comprises at least about 5% by weight of alkyl acrylate esters having from 4 to 11 carbon atoms in the ester alkyl group.

12. The copolymer of claim 1 wherein monomer (A) comprises from about 5% to about 40% by weight of alkyl acrylate esters having from 1 to 4 carbon atoms in the ester alkyl group.

13. The copolymer of claim 1 wherein monomer (A) comprises from about 60% to about 90% by weight of alkyl acrylate esters having from 9 to 11 carbon atoms in the ester alkyl group.

14. The copolymer of claim 1 wherein (B) the nitrogen containing monomer is an N-vinyl substituted heterocyclic monomer.

15. The copolymer of claim 14 wherein the N-vinyl substituted heterocyclic monomer is at least one member of the group consisting of N-vinyl imidazole, N-vinyl pyrrolidinone and N-vinyl caprolactam.

16. The copolymer of claim 1 wherein the vinyl substituted heterocyclic monomer is a vinyl pyridine.

17. The copolymer of claim 1 wherein the process is conducted in a diluent.

18. The copolymer of claim 17 wherein the diluent displays Brook-field viscosities measured by procedure ASTM D-2983 ranging from about 50 to about 400 centipoise at $-26°$ C. and from about 100 to about 1500 centipoise at $-40°$ C.

19. The copolymer of claim 17 wherein the diluent is a mineral oil.

20. The copolymer of claim 19 wherein the mineral oil consists essentially of hydrotreated naphthenic oil.

21. The copolymer of claim 19 wherein the mineral oil comprises a hydrodewaxed oil.

22. The copolymer of claim 17 wherein the diluent is a synthetic oil.

23. The copolymer of claim 22 wherein the synthetic oil is selected from the group consisting of an ester, a polyalphaolefin oligomer or an alkylated benzene.

24. The copolymer of claim 17 comprising from about 25% to about 90% by weight of monomers and from about 10% to. about 75% by weight of diluent.

25. The copolymer of claim 1 having a weight average molecular weight ranging from about 10,000 to about 500,000.

26. The copolymer of claim 25 wherein the weight average molecular weight ranges from about 30,000 to about 250,000.

27. The copolymer of claim 1 having polydispersity values ranging from about 1.2 to about 5.

28. The copolymer of claim 1 wherein the process is conducted in an extruder.

29. The copolymer of claim 28 wherein the process is conducted in the absence of any diluent.

* * * * *